Patented Oct. 29, 1940

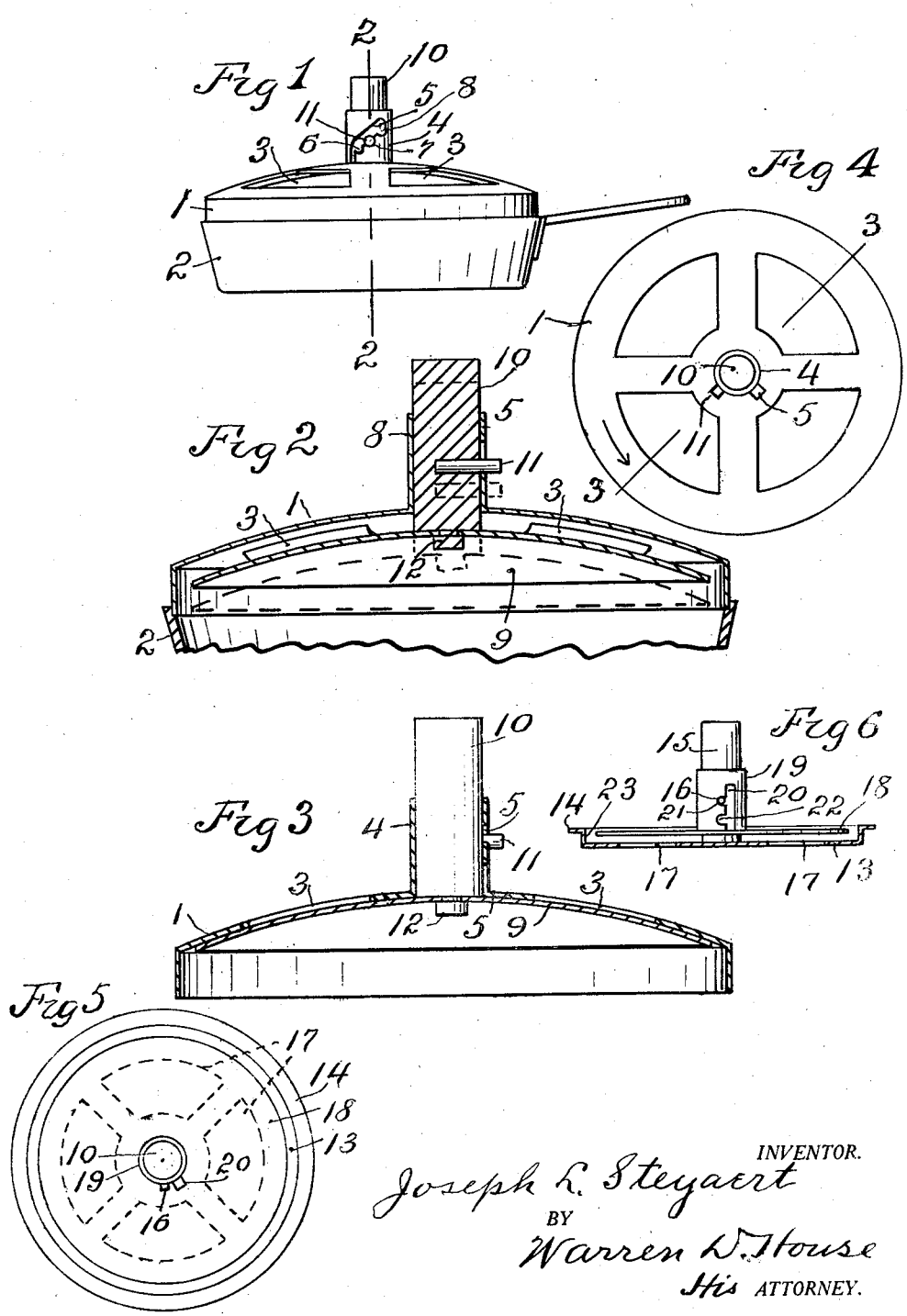

2,219,498

UNITED STATES PATENT OFFICE 2,219,498

POT OR PAN COVER

Joseph L. Steyaert, Kansas City, Mo.

Application December 11, 1939, Serial No. 308,641

6 Claims. (Cl. 53—7)

My invention relates to improvements in pot or pan covers, of a type having a vent opening for permitting the escape of steam, and having a closure for said vent opening adapted to be moved to an open position while it prevents the spattering through the vent opening, and which is adapted to close the vent opening.

One of the objects of my invention is to provide a novel device of the kind described, which is simple, strong, durable, not likely to get out of order, which permits of the easy and quick insertion of the closure to its operative position, and also permits of its ready removal for the purpose of cleaning, and which is efficient in its operation.

The novel features of my invention are hereinafter fully described and claimed.

In the accompanying drawing is shown the preferred form of my invention and also a modification thereof.

Fig. 1 is a reduced side elevation of the preferred form of my invention shown mounted on an ordinary fry pan or skillet, the closure being shown in an intermediate open position.

Fig. 2 is an enlarged section on the line 2—2 of Fig. 1, showing the closure in solid lines in the intermediate open position, and in dotted lines in its fully open position.

Fig. 3 is a vertical sectional view of the cover and the closure taken on the line 3—3 of Fig. 4, showing the closure in the closed position.

Fig. 4 is a plan view of the cover and closure, showing the closure in the closed position.

Fig. 5 is a plan view of a modified form of my invention, in which the closure is disposed above the cover.

Fig. 6 is a side view of the form shown in Fig. 5, parts being shown in vertical section and parts in side elevation.

Similar characters of reference designate similar parts in the different views.

Referring to Figs. 1 to 4, which illustrate the preferred form of my invention, I designates the body of the cover, which is adapted to rest upon a frying pan or skillet 2, or upon a pot, not shown. The cover I has one or more vent holes 3. It is provided centrally and between the vent openings 3 with an upwardly extending tubular stem 4 with an inclined slot 5, the lower end of which extends through the body I, and which at its lower side edge is provided with three notches 6, 7 and 8, disposed one higher than the one next adjacent thereto. The top of the cover I is concavo-convex, with the concave side down.

9 designates a closure for the vent openings 3, which, as shown, is circular and concavo-convex, of a curvature such that, when closed, as shown in Fig. 3, it will at its upper side fit snugly against the lower side of the cover I.

The closure 9 has extending upwardly therefrom a stem 10 which is cylindrical, as is the stem 4, in which the stem 10 is slidable and rotatable. The stem 10 has a lateral projection, which as shown is a radial pin 11 that is slidable in the slot 5 downwardly out of the slot, when the closure is to be removed for cleaning. The projection or pin 11 is adapted to enter the notches 6, 7 and 8. When the pin 11 is in the uppermost notch 8, it will support the closure in the closed position, shown in Fig. 3. When the pin is in the slot 7, it will support the closure 9 in the intermediate position, shown in solid lines in Fig 2. When the pin 11 is in the notch 6, it will support the closure 9 in its lowermost open position, as shown in dotted lines in Fig. 2.

The stem 10 has a portion 12 extending below the closure 9 to provide a finger hold to be grasped when the closure is to be inserted into or removed from its operative position.

In operation, the closure 9 is moved to the closed position, when the vent openings 3 are to be in closed position, at which time the pin 11 will register with the uppermost notch 8. The stem 10 is then rotated in the stem 4 to cause the pin 11 to enter the notch 8, in which position it will hold the closure in the closed position, shown in Fig. 3.

To lower the closure to the intermediate position, the stem 10 is turned to remove the pin 11 from the notch 8, and the closure 9 is allowed to descend to the intermediate position, shown in solid lines in Fig. 2, when the stem 10 is turned to cause the pin 11 to enter the notch 7, thus supporting the closure in said open position.

To lower the closure 9 to the lowermost operative position, the stem 10 is turned and the pin 11 caused to enter the notch 6, thus supporting the closure 9 in the lowermost operative position shown in dotted lines in Fig. 2.

To remove the closure for cleaning, the stem 10 is turned to remove it from the notch 6, and the closure is pulled downwardly by means of the finger hold 12, to cause the pin 11 to descend out of the slot 5.

In the modified form, shown in Figs. 5 and 6, 13 designates the body of the cover, which has a peripheral flange 14 adapted to rest on the top of a pot, pan or skillet. The cover 13 has a central stem 15 extending upwardly from it, which stem 15 has a lateral projection comprising a pin 16. The cover has vent openings 17.

A flat circular closure 18 is mounted over the cover 13 and is adapted to close the vent openings 17. The closure 18 has extending upwardly from it a tubular stem, slidably and rotatably fitted on the cylindrical stem 15 of the cover. The tubular stem designated by 19 has a vertical slot 20, having in one side edge two notches 21 and 22, one above the other. The pin 16 is slidable in the slot 20 and is adapted to enter the notches 21 and 22.

The pin 16 is fitted into the notch 21, as shown in Fig. 6, when the closure 18 is to be disposed in the intermediate position. It is disposed in the notch 22, when the closure 18 is to be disposed in its most open position.

When the closure 18 is to be closed, the stem 19 is turned to remove it from the notch 21 or 22 in which it may be disposed, and the closure 18 lowered to rest on top of the cover 13, thus closing the vent openings 17.

It will be noted that the bottom of the cover 13 is flat, and that it is encircled by an annular wall 23 from which outwardly extends the peripheral annular flange 14. Any grease which spatters upwardly out of the vent openings 17 will strike the closure 18 and will drop back upon the bottom of the cover 13, and will pass therefrom through the vent openings 17 into the pot or pan covered by the cover.

With the use of either of my improved devices, steam may be allowed to escape from the pot or pan, without liability of grease being spattered upon the stove or upon attending persons.

Other modifications of my invention may be made, within the scope of the appended claims without departing from the spirit of my invention.

What I claim is:

1. In a device of the kind described, in combination, a pot or pan cover having therethrough a vent opening, and a closure for said vent opening, said cover and said closure having respectively two vertical stems, one of said stems being tubular and telescopically connected with the other stem, said tubular stem having an upwardly and downwardly extending slot having in one side edge a notch, said closure being movable upwardly and downwardly to a position closing said vent opening and to an open position, said other stem having a lateral projection slidable in said slot and adapted to enter said notch and support said closure in one of said two positions.

2. In a device of the kind described, in combination, a pot or pan cover having therethrough a vent opening and having a vertical tubular stem provided with an upwardly and downwardly extending slot, having in one side edge a notch, and a closure for said vent opening having a stem slidable in said first named stem and provided with a lateral projection slidable in said slot and adapted to enter said notch, said notch and said projection being so disposed that when said projection is in said notch, said cover will be supported in the closed position.

3. In a device of the kind described, in combination a pot or pan cover having therethrough a vent opening and having a vertical tubular stem provided with an upwardly and downwardly extending slot having in one side edge two notches one higher than the other, and a closure for said vent opening having a stem slidable in said first named stem and provided with a lateral projection slidable in said slot and adapted to enter said notches, the latter being so disposed that when said projection is in the upper notch, said closure will be supported in the closed position, and when in the lower notch said closure will be supported in the open position spaced from said vent opening.

4. In a device of the kind described, in combination, a pot or pan cover having therethrough a vent opening and having a vertical tubular stem provided with an upwardly and downwardly extending slot which at its lower end extends through said cover and which has in one side edge two notches one higher than the other, and a closure for said vent opening having a stem slidable in said first named stem and projecting below said closure to form a finger hold and provided with a lateral projection slidable in said slot and adapted to enter said notches, the latter being so disposed that when said projection is in said higher notch said closure, which is located under said cover, will be supported in the closed position, and when said projection is in the lower notch said closure will be supported in the open position spaced from said vent opening, said projection being adapted to pass out of said slot through said cover, to permit of the removal of said closure, and adapted to pass upwardly in said slot through said cover, when the stem of said closure is to be inserted into the stem of said cover.

5. In a device of the kind described, in combination, a pot or pan cover having therethrough a vent opening and having a vertical stem extending upwardly from said cover and provided with a lateral projection, and a closure for said vent opening disposed above said cover and adapted to rest on said cover to close said vent opening, and provided with a vertical tubular stem slidable on said first named stem, said tubular stem having an upwardly and downwardly extending slot, which at its lower end extends through said closure and which at one side edge has two notches one higher than the other, said projection being slidable in said slot and adapted to enter said notches, and, when in the higher of said notches, supporting said closure in an open position spaced from said vent opening, and when in said lower notch supporting said closure farther from said vent open, and when out of said notches permitting said closure to rest on said cover and closing said vent opening.

6. In a device of the kind described, in combination, a pot or pan cover having therethrough a vent opening, and having a vertical stem extending upwardly from said cover and provided with a lateral projection, and a closure for said vent opening disposed above said cover and adapted to rest thereon to close said vent opening, and provided with a vertical tubular stem slidable on said first named stem and provided with an upwardly and downwardly extending slot which at its lower end extends through said closure and which has at one side edge a notch, said projection being adapted to enter said slot through the lower end thereof and when in said slot being adapted to enter said notch, the latter being so disposed that when said projection is in said notch it will support said closure in an open position, and when said projection is out of said notch it will permit said closure to pass downwardly to its closed position.

JOSEPH L. STEYAERT.